United States Patent [19]
Saitou et al.

[11] Patent Number: 4,729,523
[45] Date of Patent: Mar. 8, 1988

[54] LOCKING MECHANISM FOR WEBBING RETRACTOR

[75] Inventors: Tosio Saitou; Kenji Matsui; Keiichi Tamura; Shinji Mori; Shingo Izuchi, all of Aichi, Japan

[73] Assignee: Kabushiki Kaisha Tokai-Rika-Denki-Seisakusho, Japan

[21] Appl. No.: 741,809

[22] Filed: Jun. 6, 1985

[30] Foreign Application Priority Data

Jun. 11, 1984 [JP] Japan .................. 59-086496[U]
Aug. 6, 1984 [JP] Japan .................. 59-120834[U]
Aug. 6, 1984 [JP] Japan .................. 59-120835[U]
Aug. 9, 1984 [JP] Japan .................. 59-122267[U]

[51] Int. Cl.$^4$ ...................... B60R 22/38; B60R 22/40
[52] U.S. Cl. ...................... 242/107.4 A; 242/107.4 B
[58] Field of Search ............... 242/107.4 R–107.4 E, 242/107.7; 280/806; 297/478

[56] References Cited

U.S. PATENT DOCUMENTS

| | | | |
|---|---|---|---|
| 3,348,789 | 10/1967 | Hirsch | 242/107.4 D |
| 3,648,946 | 3/1972 | Stoffel | 242/107.4 D |
| 3,741,495 | 6/1973 | Takada | 242/107.4 D |
| 4,023,746 | 5/1977 | Magyar | 242/107.4 A X |
| 4,212,435 | 7/1980 | Kawaharazaki | 242/107.4 R X |
| 4,509,706 | 4/1985 | Thomas | 242/107.4 A |

FOREIGN PATENT DOCUMENTS 16969 7/1969 Japan.
1115 1/1972 Japan.

Primary Examiner—John M. Jillions
Attorney, Agent, or Firm—Sixbey, Friedman & Leedom

[57] ABSTRACT

A lock mechanism for a webbing retractor prevents an occupant restraining webbing from being wound off from a webbing takeup shaft when a vehicular emergency occurs. The lock mechanism is provided with a member to which the rotational force of the takeup shaft is transmitted through frictional contact and which cancels the locked state of the lock mechanism when the takeup shaft rotates in the webbing wind-up direction. Accordingly, it is possible to prevent the webbing from being gradually wound up when the vehicle is running thus avoiding any possibility of causing the webbing to undesirably tighten against the body of the occupant.

14 Claims, 42 Drawing Figures

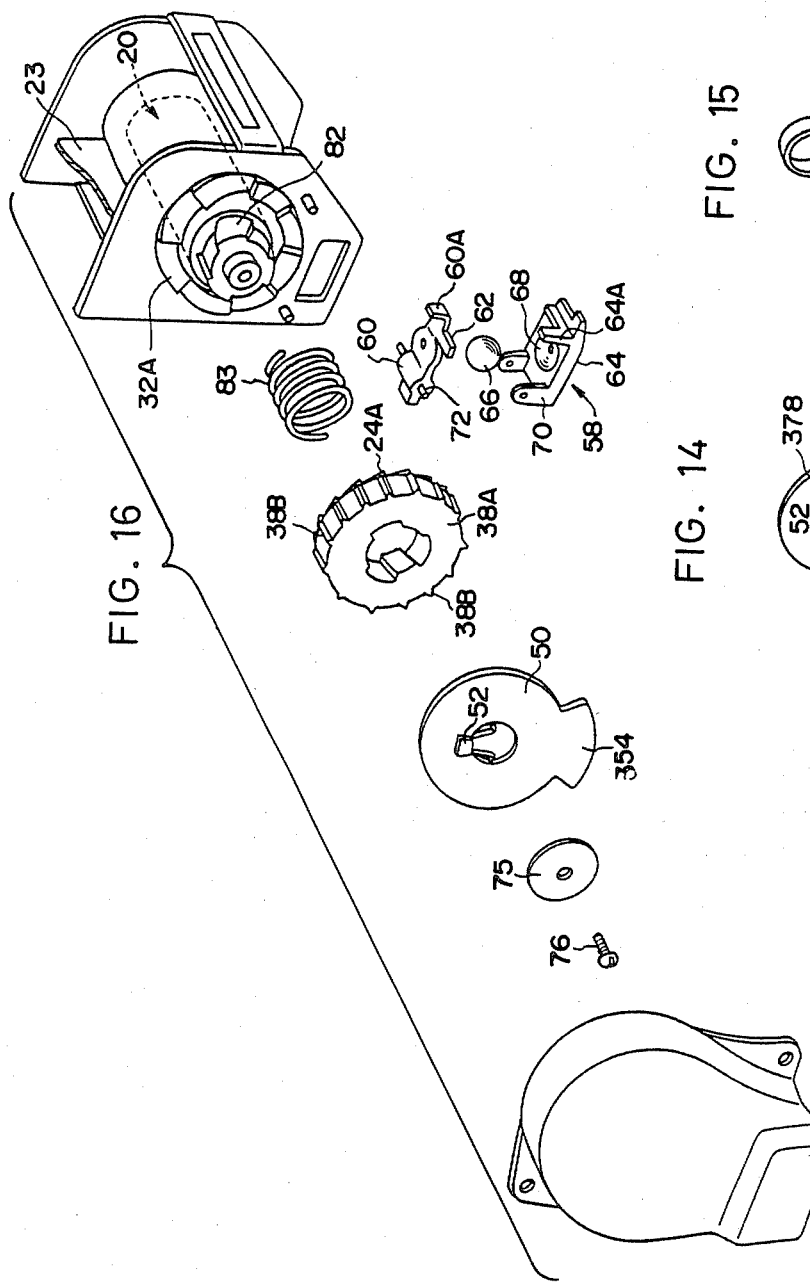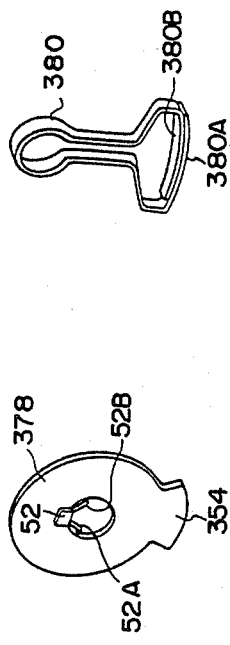

LOCKING MECHANISM FOR WEBBING RETRACTOR

BACKGROUND OF THE INVENTION

1. Field of the Invention

The present invention relates to a lock mechanism for a webbing retractor employed in a seatbelt system designed to protect an occupant of a vehicle when an emergency situation occurs, the lock mechanism being adapted to prevent an occupant retraining webbing from being wound off at the time of such an emergency.

2. Description of the Prior Art

A typical seatbelt system includes a webbing retractor into which an occupant restraining webbing is wound up from one end thereof by means of a predetermined biasing force and which incorporates a lock mechanism adapted to prevent the webbing from being wound off when a vehicular emergency occurs.

The lock mechanism has a lock ring provided in such a manner that the lock ring rotates together with the rotation of a webbing takeup shaft in the webbing wind-off direction and a resilient member interposed between the lock ring and the takeup shaft. Thus, when a vehicular emergency occurs, an acceleration sensing means causes the lock ring to be subjected to resistance which acts against the rotation of the lock ring, and a lock member which rotates together with the takeup shaft is therefore driven with a lag in terms of rotation of the lock ring relative to the takeup shaft and is engaged with lock teeth formed on a frame (see specifications of Japanese Patent Publication No. 16,969/1969 and Japanese Patent Laid-Open No. 1,115/1972).

This type of conventional lock mechanism, however, suffers from the following problems. Namely, when a vehicle is running on a rough road with many irregularities, the acceleration sensing means may be undesirably kept in an operative state. If so, the lock mechanism is unfavorably maintained in its locked state, which fact makes it impossible for the occupant to wind off the webbing. Further, during such running on a rough road, the occupant is repeatedly bumped up and down by the vibration of the vehicle, and the webbing is thereby repeatedly wound in and out. As a result, every time the webbing is wound in, the position of engagement between the lock member and the lock teeth gradually advances, so that the webbing is gradually wound up into the webbing retractor, which fact may unfavorably increase the pressure applied to the body of the occupant.

SUMMARY OF THE INVENTION

In view of the above-described situation, it is a primary object of the present invention to provide a lock mechanism for a webbing retractor which involves no risk of the webbing being gradually wound up into the webbing retractor even when a given length of the webbing is repeatedly wound in and out.

To this end, the invention provides a lock mechanism for a webbing retractor in which a limiting member is pivoted by means of the rotational force of the webbing takeup shaft through a frictional contact means in such a manner that, when the takeup shaft rotates in the webbing wind-up direction, the limiting member prevents the lock ring from being subjected to the resistance which is applied by the acceleration sensing means and which acts against the rotation of the lock ring.

Accordingly, when the webbing is wound up, the limiting member prevents the application of the above-described resistance to the lock ring by the acceleration sensing means and allows the lock ring to rotate. In consequence, the lock ring is rotated in the webbing wind-off direction by the action of the resilient member interposed between the takeup shaft and the lock ring. Accordingly, in the next webbing wind-off operation, the lock ring engages with the acceleration sensing means at the same position as that where the previous locking condition was established, or engages with the acceleration sensing means in the state wherein the lock ring has been rotated in the webbing wind-off direction. Therefore, even when a given length of the webbing is repeatedly wound in and out many times, there is no risk of the webbing being gradually wound up.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 14 is a perspective view of a limiting plate employed in a sixth embodiment of the present invention;

FIG. 15 is a perspective view of a spring plate employed in a seventh embodiment of the present invention;

FIG. 16 is an exploded perspective view of a webbing retractor to which an eighth embodiment of the present invention is applied;

DESCRIPTION OF THE PREFERRED EMBODIMENTS

Figure 1:
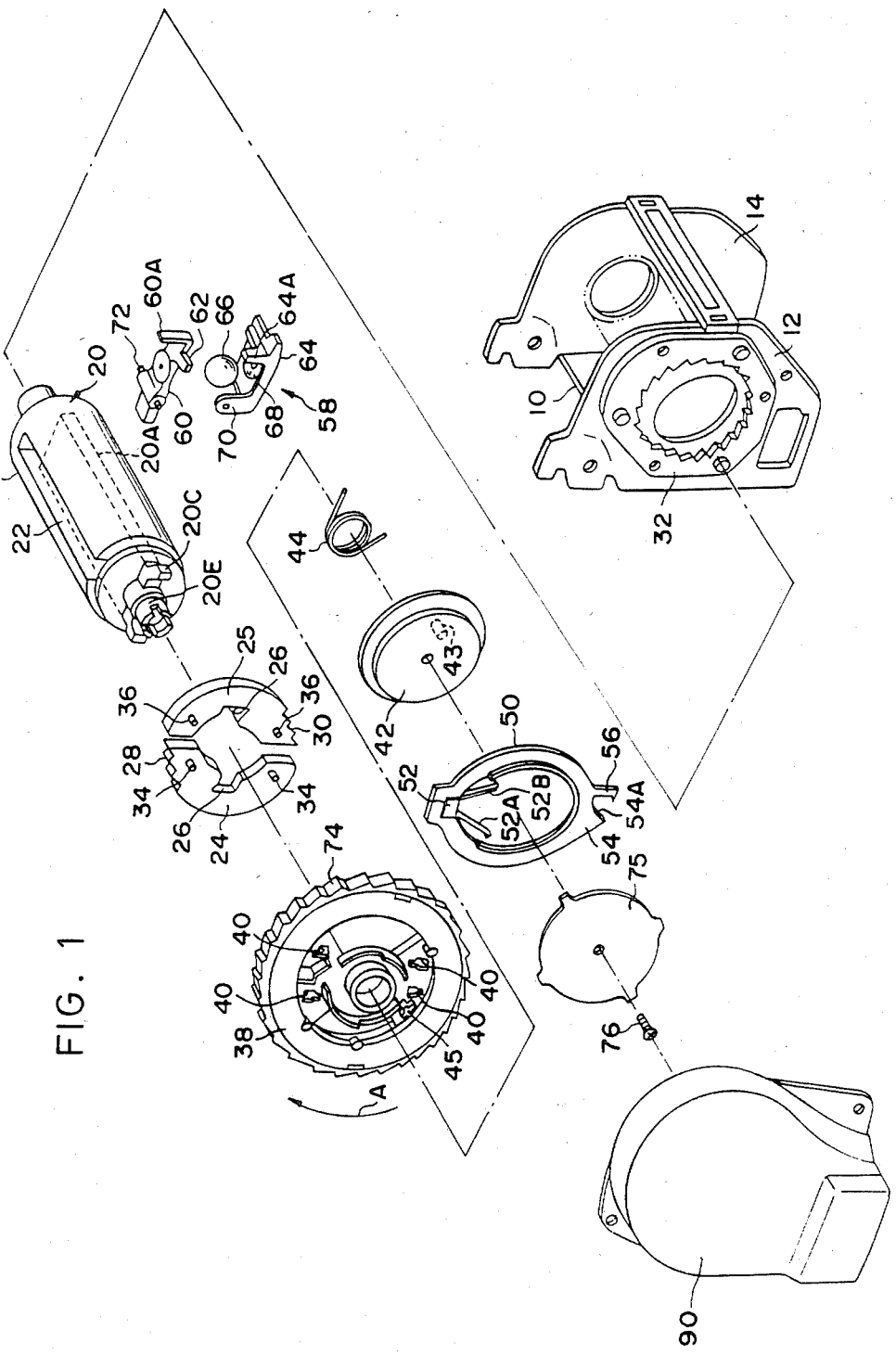
FIG. 1 is an exploded perspective view of a webbing retractor to which a first embodiment of the lock mechanism according to the present invention is applied.

FIG. 1 is an exploded perspective view of a webbing retractor to which a first embodiment of the lock mechanism according to the present invention is applied. In this webbing retractor, a frame 10 is secured to a vehicle body by mounting bolts (not shown). The frame 10 has a pair of parallel leg plates 12 and 14 extending from both sides thereof.

Figure 2:
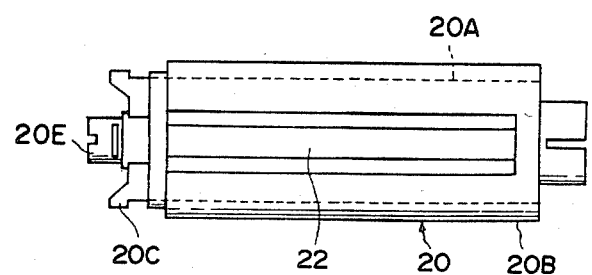
FIG. 2 is a side elevational view of a webbing takeup shaft employed in the webbing retractor shown in FIG. 1.

The leg plates 12 and 14 rotatably support a webbing takeup shaft 20 which is also shown in FIG. 2. The takeup shaft 20 has at its center a through-hole 22 extending radially thereof. One end of an occupant restraining webbing (not shown) is retained by the through-hole 22. The webbing is wound up in layers on the takeup shaft 20. A tongue plate is secured to the other end portion of the webbing. An occupant of the vehicle engages the tongue plate with a buckle device which is secured to the vehicle body, whereby it is possible for the occupant to be fastened by an intermediate portion of the webbing.

The takeup shaft 20 is composed of a core bar 20A which is formed of a thick-walled plate material and a synthetic resin layer 20B which is integrally formed around the core bar 20A by means of molding in such a manner that the takeup shaft 20 has a cylindrical external shape.

One end portion of the core bar 20A projects from one of the longitudinal ends of the synthetic resin layer 20B such as to provide a projecting portion 20C. The other end of the synthetic resin layer 20B projects from the leg plate 14. A spiral spring retractor (not shown) is interposed between the synthetic resin layer 20B and the leg plate 14 in such a manner that the takeup shaft 20 is biased in the webbing wind-up direction.

Figure 3:
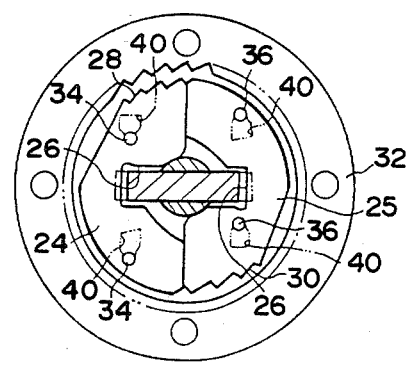
FIG. 3 is a front elevational view of a part of the lock mechanism, which shows the relationship between lock plates and an internally-toothed rachet wheel.

Lock plates 24 and 25 (shown in FIG. 1) which serve as lock members are disposed around the projecting portion 20C. Each of the lock plates 24 and 25 has a substantially U-shaped notched recess 26 formed in its center, thus having a substantially C-shaped form as a whole. The projecting portion 20C of the takeup shaft 20 is received in the notched recesses 26, thereby allowing the lock plates 24 and 25 to rotate together with the takeup shaft 20. The width of each of the notched recesses 26 is made slightly larger than the width of the projecting portion 20C as shown in FIG. 3, thereby allowing the lock plates 24 and 25 to rotate relative to the takeup shaft 20 by a predetermined angle.

A pawl portion 28 is formed at one end of the lock plate 24, and a pawl portion 30 at one end of the lock plate 25. These pawl portions 28 and 30 oppose the lock teeth of an internally-toothed ratchet wheel 32 which is secured to the leg plate 12.

Further, a pair of pins 34 project from the lock plate 24, and a pair of pins 36 from the lock plate 25. These pins 34 and 36 are respectively inserted into slots 40 which are formed in a lock ring 38. The lock ring 38 is supported on a smaller-diameter shaft portion 20E which axially projects from one end of the takeup shaft 20 in the central portion of its circumference in such a manner that the lock ring 38 is rotatable relative to the takeup shaft 20.

Moreover, a torsion coil spring 44 is interposed between the lock ring 38 and a spring retainer pin 43 provided on a rotating wheel 42 which is secured to the distal end of the smaller-diameter shaft portion 20E. The torsion coil spring 44 is coaxially supported on the lock ring 38. One end of the spring 44 abuts against the spring retainer pin 43 of the rotating wheel 42 while the other end abuts against a spring retainer pin 45 which projects from the lock ring 38. The lock ring 38 is biased by means of the force of the torsion coil spring 44 such as to rotate in the webbing wind-off direction (the direction of the arrow A in FIG. 1) of the takeup shaft 20. Accordingly, the lock ring 38 is normally biased by means of the force of the torsion coil spring 44 such as to cause each of the pins 34 and 36 of the lock plates 24 and 25 to be housed in one end portion of each of the slots 40, thus causing the pawl portions 28 and 30 to be separated from the internally-toothed ratchet wheel 32 as shown in FIG. 3.

Figure 4:
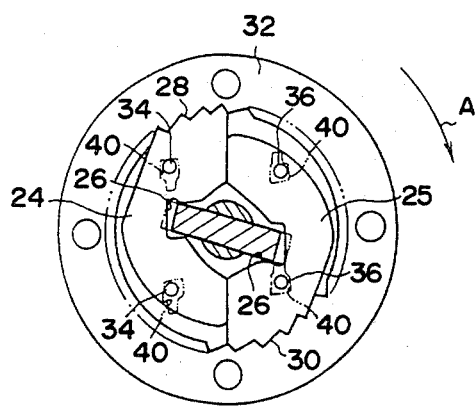
FIG. 4 shows the operation of the part of the lock mechanism shown in FIG. 3.
Figure 5:
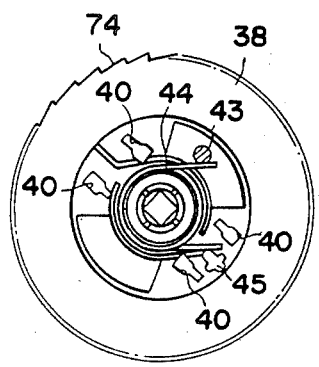
FIG. 5 illustrates the way in which a lock ring and a torsion coil spring employed in the lock mechanism are assembled together.

However, when relative rotation occurs between the lock ring 38 and the takeup shaft 20 which rotates in the webbing wind-off direction, the lock ring 38 has a rotational lag against the biasing force of the torsion coil spring 44. At that time, the lock ring 38 causes the lock plates 24 and 25 to be guided in the longitudinal direction of the slots 40, whereby the pawl portions 28 and 30 are engaged with the internally-toothed ratchet wheel 32 in the manner shown in FIG. 4.

Figure 6:
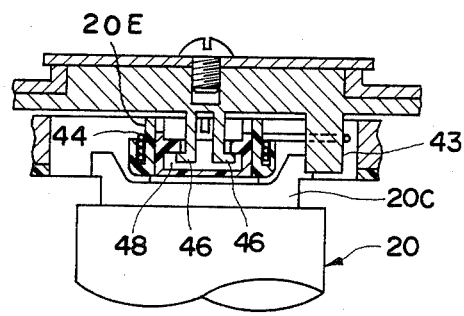
FIG. 6 is a sectional view of a part of the lock mechanism, which shows the way in which the webbing takeup shaft and a rotating wheel are assembled together.

It is to be noted that the rotating wheel 42 has, as shown in FIG. 6, a pair of retainer pawls 46 received in a rectangular bore 48 which is formed in the takeup shaft 20, whereby the rotating wheel 42 is retained by the takeup shaft 20 and rotates together with the takeup shaft 20 in one unit.

A limiting plate 50 which serves as a limiting member is pivotally supported on the outer periphery of the rotating wheel 42. The central portion of a leaf spring 52 is pivotally supported at one portion of the inner periphery of the limiting plate 50. Both end portions 52A and 52B of the leaf spring 52 are brought into resilient contact with the outer periphery of the rotating wheel 42, whereby the limiting plate 50 receives the rotational force of the rotating wheel 42 through frictional contact between the end portions 52A and 52B and the outer periphery of the rotating wheel 42.

A pair of projections 54 and 56 radially project from the outer periphery of the limiting plate 50. A pin 62 which projects from an actuator 60 of an acceleration sensing means 58 is inserted in the area between the projections 54 and 56. Thus, the movement of the pin 62 is limited by the limiting plate 50.

More specifically, the acceleration sensing means 58 includes a ball casing 64 secured to the leg plate 12. The ball casing 64 houses a ball 66 which serves as a rolling element. The ball 66 is received in a conical recess 68 which is formed in the ball casing 64 in such a manner that the ball 66 goes up the conical recess 68 when acceleration occurs. The actuator 60, which is pivotally supported by a bracket 70 through a pin 72, is mounted on the ball 66. The arrangement is such that, when the ball goes up the conical recess 68, the actuator 60 is pivoted about the pin 72, thus causing a pole 60A formed at the distal end of the actuator 60 to engage with one of the ratchet teeth 74 which are cut on the outer periphery of the lock ring 38.

The pivoting angle or the range of pivotal movement of the limiting plate 50 is limited by the projection 54 which abuts against the pin 62 and the projection 56 which abuts against an arm 64A which projects from the ball casing 64. Thus, the limiting plate 50 is adapted to be pivotal in such a manner that, when the takeup shaft 20 rotates in the webbing wind-off direction, the limiting plate 50 turns until the projection 56 abuts against the arm 64A; when the takeup shaft 20 rotates in the webbing wind-up direction, the limiting plate 50 turns until the projection 54 abuts against the pin 62. The limiting plate 50 has a slanting cam surface 54A formed near the projection 54 such that, when the takeup shaft 20 rotates in the webbing wind-up direction, the slanting cam surface 54A pushes down the pin 62, thus causing the pole 60A to be separated from the ratchet tooth 74 with which it has been engaged in the manner shown in FIG. 7(D).

It is to be noted that a stopper plate 75 is, as shown in FIG. 1, secured to the rotating wheel 42 by a screw 76, thereby preventing the limiting plate 50 from coming off the rotating wheel 42. Further, the internally-toothed ratchet wheel 38, the rotating wheel 42 and so forth are covered with a cover 90 which is secured to the outside of the leg plate 12.

The following is a description of the operation of this embodiment.

When the vehicle is in a normal state, the limiting plate 50 is in the condition shown in FIG. 7(A), in which the ball 66 does not push up the actuator 60. In consequence, the actuator 60 is separated from the ratchet teeth 74 irrespective of the pivotal movement of the limiting plate 50. For this reason, it is possible for the occupant who is fastened by the webbing to freely wind the webbing onto or off the takeup shaft 20 so as to be able to assume a desired driving posture.

When the vehicle is in an emergency situation such as a collision, the ball 66 pushes up the actuator 60 in such a manner that the actuator 60 pivots about the pin 72. Consequently, the pole 60A is engaged with one of the ratchet teeth 74.

Figure 7:
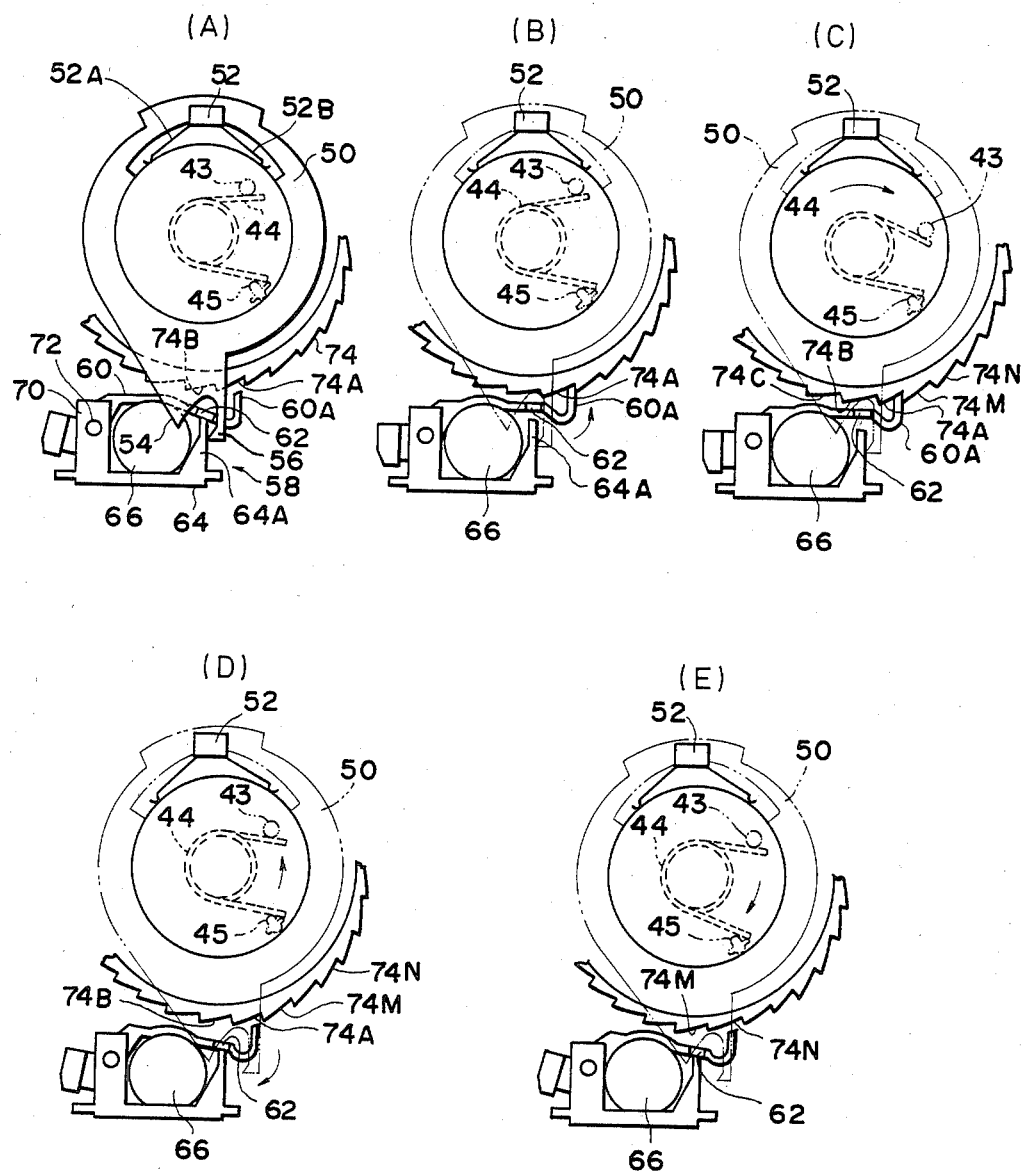
FIGS. 7(A) to 7(E) illustrate the operations of a limiting plate, an actuator and their associated elements which are employed in the first embodiment.

On the other hand, the occupant is moved in the direction in which acceleration acts. The webbing is therefore wound off from the takeup shaft 20, causing the takeup shaft 20 to rotate in the clockwise direction as viewed in FIG. 7. In consequence, the lock ring 38 which rotates together with the takeup shaft 20 is prevented from rotating by means of the actuator 60, which fact causes relative rotation between the lock ring 38 and the takeup shaft 20. This relative rotation causes the torsion coil spring 44 to be deformed as shown in FIG. 7(C), and the pins 34 and 36 of the lock plates 24 and 25 which rotate together with the takeup shaft 20 are guided by the respective slots 40 formed in the lock ring 38 in such a manner that the pawl portions 28 and 30 are engaged with the internally-toothed ratchet wheel 32, whereby the takeup shaft 20 is prevented from rotating in the webbing wind-off direction. As a result, the occupant is brought into a reliable webbing restrained condition.

When the vehicle is running on a rough road with many irregularities, the ball 66 is held in a state wherein it continuously pushes up the actuator 60. At the same time, the occupant is bumped up and down by the vibration of the vehicle body, and the webbing is therefore repeatedly wound in and out on the takeup shaft 20.

On such an occasion, in the conventional webbing retractor, every time the webbing is wound up, the lock ring 38 rotates counterclockwise from the position shown in FIG. 7(C) by an amount corresponding to one or more ratchet teeth 74 and then reengages with the actuator 60, which fact disadvantageously causes the webbing to be gradually wound up onto the takeup shaft 20. More specifically, in the case where the racthet tooth 74A is engaged with the pole 60A in the state shown in FIG. 7(C), the vibration of the vehicle may cause the ratchet tooth 74B or 74C to be engaged with the pole 60A, and the webbing is thereby gradually wound up onto the takeup shaft 20.

In the present invention, however, the above-described problem is solved by the provision of the limiting plate 50. More specifically, as shown in FIG. 7(D), when the limiting plate 50 is pivoted by the force derived from the rotation of the takeup shaft 20 in the webbing wind-up direction, the slanting cam surface 54A pushes down the pin 62 of the actuator 60, thus causing the pole 60A to be separated from the ratchet teeth 74. In consequence, the lock ring 38 which is being biased by means of the force of the compressed torsion coil spring 44 is turned in the clockwise direction by virtue of the biasing force of the spring 44 in the manner shown in FIG. 7(E). Accordingly, the pin 62 of the actuator 60 which has opposed the ratchet tooth 74A now opposes the ratchet tooth 74N.

Even if, thereafter, the takeup shaft 20 is further rotated in the webbing wind-off direction as the result of the vibration of the vehicle, the pole 60A of the actuator 60 engages with the ratchet tooth 74M or 74N. Consequently, the takeup shaft 20 is locked in the state wherein it has further rotated in the webbing wind-off direction from the position in the previous locked state by an amount which corresponds to one or more ratchet teeth 74. There is therefore no risk of the webbing being gradually wound up onto the takeup shaft 20.

Thus, this embodiment involves no fear of the webbing being gradually wound up onto the takeup shaft even when the vehicle is running on a rough road. It is therefore possible for the occupant to maintain driving comfort.

Figure 8:
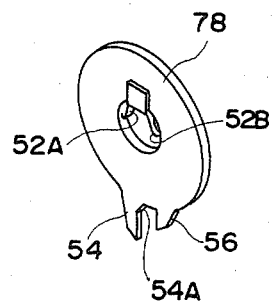
FIG. 8 is a perspective view of a limiting plate employed in a second embodiment of the present invention.

Referring next to FIG. 8, there is shown a limiting plate 78 which is employed in a second embodiment of the present invention. This limiting plate 78 is adapted to serve also as the rotating wheel 42 employed in the above-described embodiment. Accordingly, the limiting plate 78 is pivotally supported on the smaller-diameter shaft portion 20E of the takeup shaft 20, and both end portions 52A and 52B of the leaf spring 52 are disposed such as to receive rotational force from the smaller-diameter shaft portion 20E through frictional contact therebetween in a manner similar to that of the first embodiment.

Figure 9:
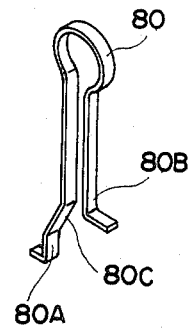
FIG. 9 is a perspective view of a spring plate employed in a third embodiment of the present invention.

FIG. 9 shows a spring plate 80 which is employed in a third embodiment of the present invention in place of the limiting plates 50 and 78 which are respectively employed in the first and second embodiments. This spring plate 80 is formed by bending a leaf spring into a substantially U-shape. The central portion of the spring plate 80 is brought into resilient contact with the smaller-diameter shaft portion 20E of the takeup shaft 20 shown in FIG. 1 such as to receive the rotational force of the takeup shaft 20, and both end portions 80A and 80B of the spring plate 80 respectively oppose the pin 62 and the arm 64A of the actuator 60 so that the end portions 80A and 80B respectively serve as the projections 54 and 56 in the above-described embodiments. The spring plate 80 is also formed with a slanting surface 80C which is similar to the slanting cam surfaces 54A in the above-described embodiments.

Figure 10:
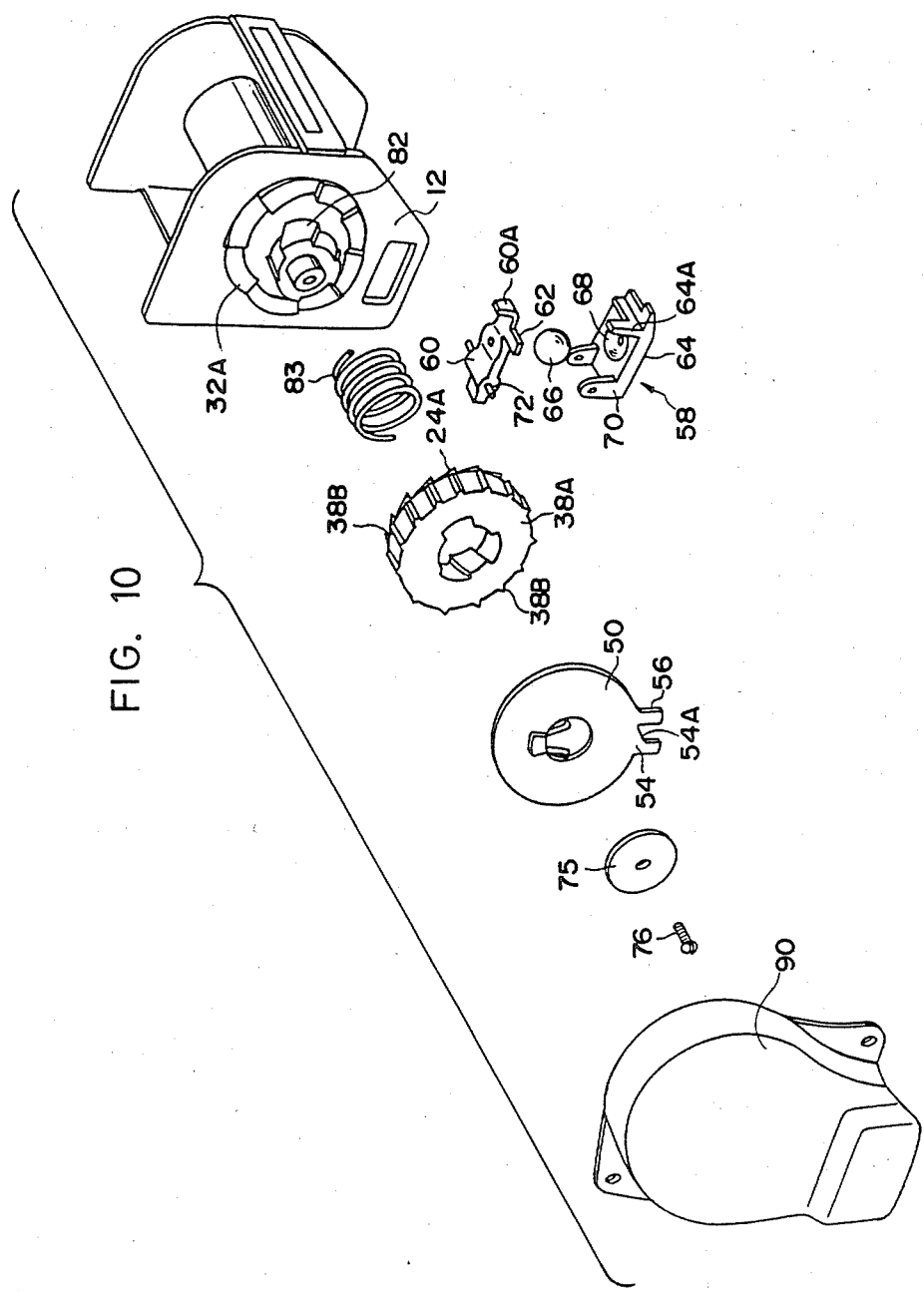
FIG. 10 is an exploded perspective view of a webbing retractor to which a fourth embodiment of the present invention is applied.

Referring next to FIG. 10, there is shown a fourth embodiment of the present invention. In this embodiment, a lock ring 38A is engaged with a screw 82 which is formed at the axial end portion of the takeup shaft 20. The lock ring 38A is moved axially of the takeup shaft 20 when relative rotation occurs between the lock ring 38A and the takeup shaft 20 as the result of the engagement between the pole 60A of the actuator 60 and one of the projections 38B which are formed on the outer periphery of the lock ring 38A. In consequence, ratchet teeth 24A which are formed at one axial end of the lock ring 38A such as to serve as a lock member are engaged with lock teeth 32A which are formed on the leg plate 12, whereby the rotation of the takeup shaft 20 is prevented. The lock ring 38A is biased by the action of a compression coil spring 83 in the direction in which the lock ring 38A separates from the leg plate 12.

In this embodiment also, the actuator 60 which engages with the lock ring 38A is separated from the lock ring 38A when the webbing is wound up by the action of the limiting plate 50 which receives the rotational force of the takeup shaft 20 through frictional contact. It is therefore possible to obtain effects similar to those which are offered by the other embodiments described above.

Figure 11:
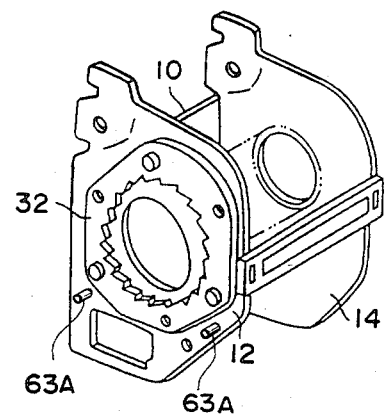
FIG. 11 is a perspective view of a frame employed in a fifth embodiment of the present invention.
Figure 12:
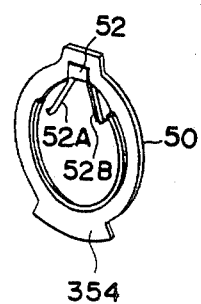
FIG. 12 is a perspective view of a limiting plate employed in the fifth embodiment.

The following is a description of a fifth embodiment of the present invention with reference to FIGS. 11 and 12.

In this embodiment, stopper pins 63A and 63B project from the leg plate 12 secured to the frame 10. The limiting plate 50 in this embodiment is provided with a cam projection 354 in place of the pair of projections 54 and 56 shown in FIG. 1, the cam projection 354 radially projecting from the outer periphery of the plate 50 and having a predetermined circumferential length. The outer periphery of the cam projection 354 opposes the pin 62 projecting from the actuator 60 of the acceleration sensing means 58 such as to limit the movement of the actuator 60 in a manner similar to that of the first embodiment. The outer periphery of the cam projection 54 also opposes the stopper pins 63A and 63B such as to limit the pivoting angle of the limiting plate 50.

Accordingly, the limiting plate 50 is adapted to be pivotal in such a manner that, when the takeup shaft 20 rotates in the webbing wind-off direction, the limiting plate 50 turns until the cam projection 354 abuts against the stopper pin 63A; when the takeup shaft 20 rotates in the webbing wind-up direction, the limiting plate 50 turns until the cam projection 354 abuts against the stopper pin 63B.

Figure 13A:
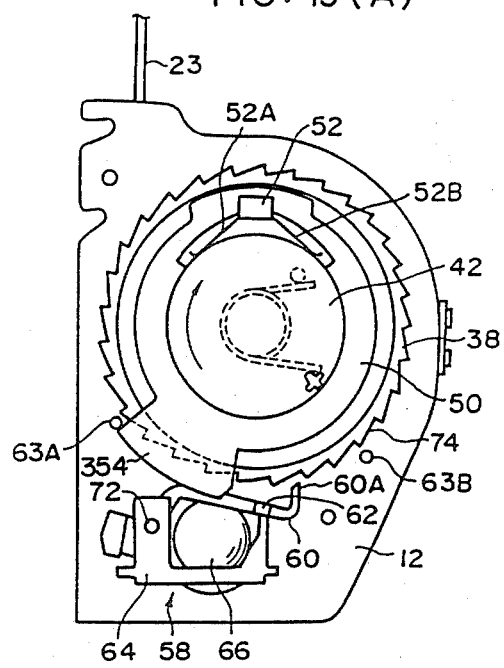
FIG. 13(A) is a side elevational view of the fifth embodiment.
Figure 13B:
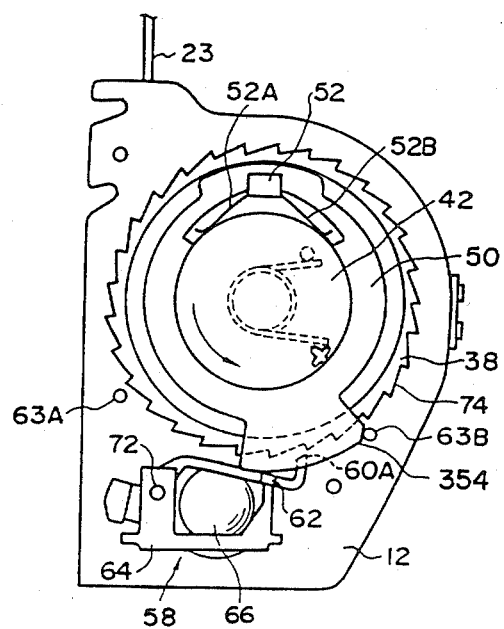
FIG. 13(B) shows the operation of the fifth embodiment.

The cam projection 354 is adapted such that, when the takeup shaft 20 rotates in the webbing wind-off direction in response to the wind-off of the webbing 23 as shown in FIG. 13(A), the cam projection 354 separates from the pin 62, thus allowing the pole 60A to engage with one of the ratchet teeth 74; when the takeup shaft 20 rotates in the webbing wind-up direction as shown in FIG. 13(B), the cam projection 354 pushes down the pin 62, thus causing the pole 60A to be separated from the ratchet tooth 74 with which it has been engaged.

The arrangement is such that, in the case where the pole 60A of the actuator 60 is engaged with one of the ratchet teeth 74 in the state shown in FIG. 13(A), even if the takeup shaft 20 rotates in the webbing wind-up direction, the cam projection 354 does not immediately push down the pin 62. More specifically, when the webbing 23 is wound off by the action of acceleration in the state wherein the ball 66 causes the pole 60A to engage with one of the ratchet teeth 74, the webbing 23 is wound off while the lock ring 38 is at rest, and the state of the lock plates 24 and 25 changes from that shown in FIG. 3 to that shown in FIG. 4. In other words, the lock plates 24 and 25 are engaged with the internally-toothed ratchet wheel 32, whereby the wind-off of the webbing 23 is suspended. Thereafter, when the webbing 23 is wound up, the reverse operation takes place. More specifically, the webbing 23 is wound up while the lock ring 38 is at rest, and the lock plates 24 and 25 are separated from the internally-toothed ratchet wheel 32 to reach the state shown in FIG. 3. Thereupon, the lock ring 38 also starts to rotate in the webbing wind-up direction. At this time the pole 60A is released from the engagement with the lock ring 38. The rotational angle of the cam projection 354 is set such that, after the engagement between the pole 60A and the lock ring 38 has been cancelled, the cam projection 354 pushes down the actuator 60. Accordingly, the arrangement is such that the cam projection 354 abuts against the pin 62 of the actuator 60 which is engaged with the lock ring 38 after the rotating wheel 42 has rotated a predetermined angle in the counterclockwise direction from the position shown in FIG. 13(A). This angle equals the amount by which the takeup shaft 22 rotates in order for the pole 60A to be released from engagement with the lock ring 38 and brought into light contact with the lock ring 38 or into a position slightly separated therefrom.

Thus, when the takeup shaft 22 rotates in the webbing wind-up direction, the pole 60A is released from its engagement with the ratchet tooth 74 of the lock ring 38 with which it has been engaged. However, when the vehicle is running on a rough road, since the ball 66 is then held at its raised position, the pole 60A is also held at the position where it reengages with the lock ring 38 if the webbing 23 is wound off and the lock ring 38 is thereby caused to rotate in the webbing wind-off direction. Accordingly, if the webbing 23 is further wound up, the cam projection 354 pushes down the actuator 60, thus causing the pole 60A to move to a position (outside the locus of rotation of the lock ring 38) where the pole 60A cannot engage with the lock ring 38.

In this embodiment also, when the vehicle is running on a very rough road, the ball 66 continuously pushes up the actuator 60. At the same time, the occupant moves vertically in response to the vibration of the vehicle body, and the webbing is therefore repeatedly wound in and out on the takeup shaft 20.

However, the limiting plate 50 which pivots in response to the rotation of the takeup shaft 20 in the webbing wind-up direction causes the cam projection 354 to push down the pin 62 of the actuator 60 after the engagement between the pole 60A and the lock ring 38 has been cancelled as described above, whereby the pole 60A is separated from the ratchet teeth 74, as shown in FIG. 13(B). For this reason, even if the takeup shaft 20 is further rotated in the webbing wind-off direction as the result of the vibration of the vehicle, the pole 60A of the actuator 60 does not engage with the lock ring 38 unless the webbing is wound off by a length which corresponds to the circumferential length of the cam projection 354. Moreover, even if the webbing is wound off by a length which exceeds the length of the cam projection 354, since the pole 60A engages with the same one of the ratchet teeth 74 of the lock ring 38 as that in the previous engagement, there is no risk of the webbing being gradually wound up on the takeup shaft 20.

Thus, this embodiment also involves no fear of the webbing being gradually wound up even when the vehicle is running on a rough road. It is therefore possible for the occupant to maintain driving comfort.

When the vehicle is running on a road in normal conditions, the takeup shaft 20 keeps the limiting plate 50 in the state shown in FIG. 13(B) by means of the wind-up force of the spiral spring, and the actuator 60 is consequently pushed down. There is therefore no possibility of the ball 66 generating any abnormal noise as the result of the vibration of the vehicle.

Referring now to FIG. 14, there is shown a limiting plate 378 which is employed in a sixth embodiment of the present invention. This limiting plate 378 is adapted to serve also as the rotating wheel 42 in the first embodiment. The limiting plate 378 is pivotally supported at the smaller-diameter shaft portion 20E of the takeup shaft 20, and both end portions 52A and 52B of the leaf spring 52 are brought into resilient contact with the smaller-diameter shaft portion 20E such as to receive rotational force from the shaft portion 20E through frictional contact therebetween in a manner similar to that in the first embodiment.

FIG. 15 shows a spring plate 380 which is employed in a seventh embodiment of the present invention in place of the limiting plates 50 and 378 which are respectively employed in the above-described embodiments. This spring plate 380 is formed by bending a leaf spring. The spring plate 380 has its central portion brought into resilient contact with the smaller-diameter shaft portion 20E of the takeup shaft 20 shown in FIG. 1 such as to receive the rotational force of the takeup shaft 20. In addition, both end portions 380A and 380B of the spring plate 380 are bent such as to provide in combination a function which is similar to that of the cam projection 354 in the above-described embodiments.

Referring next to FIG. 16, there is shown an eighth embodiment of the present invention. In this embodiment also, the lock ring 38A is engaged with the screw 82 which is formed at one axial end portion of the takeup shaft 20. The lock ring 38A is moved axially of the takeup shaft 20 when relative rotation occurs between the lock ring 38A and the takeup shaft 20 as the result of the engagement of the pole 60A of the actuator 60 and one of the projections 38B formed on the outer periphery of the lock ring 38A. In consequence, the ratchet teeth 24A which are formed at one axial end of the lock ring 38A such as to serve as a lock member are engaged with the lock teeth 32A formed on the leg plate 12, whereby the rotation of the takeup shaft 20 is prevented. The lock ring 38A is biased by the action of the compression coil spring 83 in the direction in which the lock ring 38A separates from the leg plate 12.

This embodiment is also arranged such that the actuator 60 which is engaged with the lock ring 38A is separated from the lock ring 38A when the webbing is wound up by the action of the cam projection 354 of the limiting plate 50 which receives the rotational force of the takeup shaft 20 through frictional contact. Thus, it is possible to obtain effects similar to those which are offered by the above-described embodiments.

It is possible to alter as desired the circumferential length of the cam projection 354 provided on the limiting plate 50 in the above-described embodiments. It is, however, preferable for the length of the cam projection 354 to correspond to the length (about 2 cm) of the webbing 23 which is generally wound in and out repeatedly when the vehicle is running on a rough road.

Figure 17:
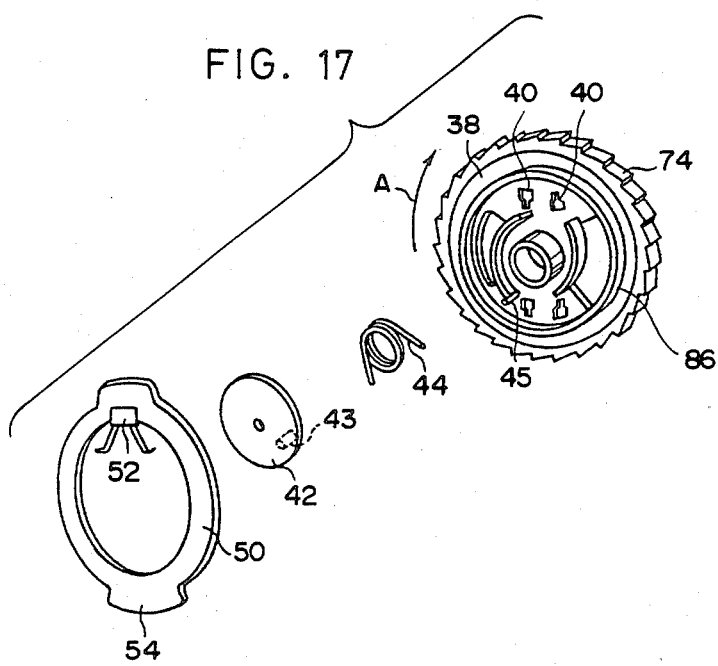
FIG. 17 is an exploded perspective view of a ninth embodiment of the present invention.

Although in the above-described embodiments the limiting plate 50 directly receives rotational force from the takeup shaft 20 through frictional contact, the present invention is not necessarily limitative in this respect and it is also possible to employ an arrangement wherein the limiting plate 50 is pivoted through frictional contact between the same and the lock ring 38, such as that in a ninth embodiment of the present invention which is shown in FIG. 17. In such a case, even if the webbing is wound up in a locked state, the lock 38 rotates with a rotational lag. The arrangement may, therefore, be such that the limiting plate 50 immediately pushes down the actuator 60 in response to the rotation of the lock ring 38.

In the ninth embodiment, the limiting plate 50 is pivotally supported on a collar 86 which is provided on the lock ring 38, and the leaf spring 52 is brought into resilient contact with the outer periphery of the collar 86, whereby the limiting plate 50 receives the rotational force of the lock ring 38 through the frictional contact therebetween.

Figure 18:
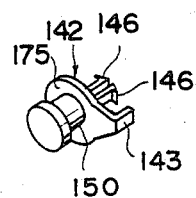
FIG. 18 is a perspective view of a rotating cap employed in a tenth embodiment of the present invention.
Figure 19:
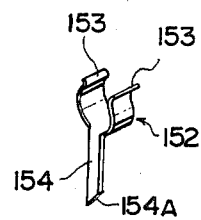
FIG. 19 is a perspective view of a friction spring employed in the tenth embodiment.
Figure 20:
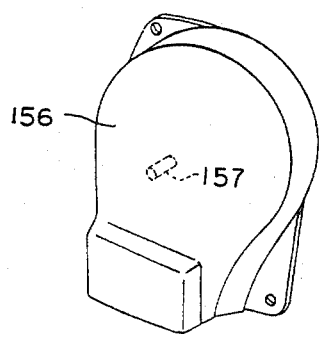
FIG. 20 is a perspective view of a cover employed in the tenth embodiment.

The following is a description of a tenth embodiment of the present invention with reference to FIGS. 18 to 20.

In this embodiment, the following members are employed in place of the corresponding members in the first embodiment: a rotating cap 142 in place of the rotating wheel 42; a friction spring 152 as a limiting member in place of the limiting plate 50; and a cover 156 in place of the cover 90, the cover 156 having a pin 157 projecting from its inner surface.

Figure 21:
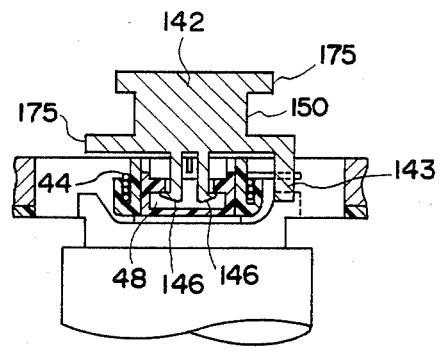
FIG. 21 is a sectional view of a part of the tenth embodiment, which shows the way in which the webbing takeup shaft and the rotary cap are assembled together.

The rotating cap 142 has, as shown in FIG. 21, a pair of retainer pawls 146 engaged with the rectangular bore 48 formed in the takeup shaft 20, whereby the rotating cap 142 is retained by the takeup shaft 20 and is rotatable together therewith in one unit in a manner similar to that of the first embodiment.

The rotating cap 142 has the above-described friction spring 152 serving as a limiting member resiliently fitted on the outer peripheral surface 150 thereof in such a manner that the rotational force of the rotating cap 142 is transmitted to the friction spring 152 through the frictional contact therebetween. The friction spring 152 has its peripheral end portions 153 bent outwardly. It is therefore possible for the friction spring 152 to be easily mounted on the rotating cap 142 by bringing the peripheral end portions 153 into contact with the outer peripheral surface 150 and pressing the friction spring 152 toward the central axis of the rotating cap 142.

The friction spring 152 has a projection 154 projecting radially from the opposite end thereof relative to the peripheral end portions 153, the projection 154 being formed by bending the central portion of the spring 152. The projection 154 is adapted to separate the pole 60A of the actuator 60 from the ratchet teeth 74 when the webbing is wound up.

The pivoting angle of the friction spring 152 is limited by the range of allowable movement of the projection 154 which abuts against the pin 62 of the actuator 60 at one extremity of its movement and abuts against the pin 157 of the above-described cover 156 at the other extremity. Thus, the friction spring 152 is adapted to be pivotal in such a manner that, when the takeup shaft 20 rotates in the webbing wind-off direction, the friction spring 152 turns until the projection 154 abuts against the pin 157; when the takeup shaft 20 rotates in the webbing wind-up direction, the friction spring 152 turns until the projection 154 abuts against the pin 62. The projection 154 has a slanting cam surface 154A formed at its distal end. This slanting cam surface 154A is designed such that, when the takeup shaft 20 rotates in the webbing wind-up direction, the cam surface 154A pushes down the pin 62, thus causing the pole 60A to be separated from the ratchet teeth 74, as shown in FIG. 22(D), in a manner similar to that in the first embodiment.

It is to be noted that the rotating cap 142 has collars 175 provided at both ends of the outer peripheral surface 150, whereby the friction spring 152 is prevented from coming off the rotating cap 142.

The operation of this embodiment will now be explained.

During normal running of the vehicle, as shown in FIG. 22(A), the ball 66 is in a state wherein it does not push up the actuator 60, and the actuator 60 is therefore separated from the ratchet teeth 74 irrespective of the rotation of the friction spring 152. For this reason, it is possible for the occupant who is fastened by the webbing to freely cause the webbing to be wound in and out on the takeup shaft 20 so that he may assume a desired driving posture.

When the vehicle is in an emergency situation such as a collision, the ball 66 pushes up the actuator 60 in such a manner that the actuator 60 pivots about the pin 72, thus causing the pole 60A to engage with one of the ratchet teeth 74.

Figure 22:
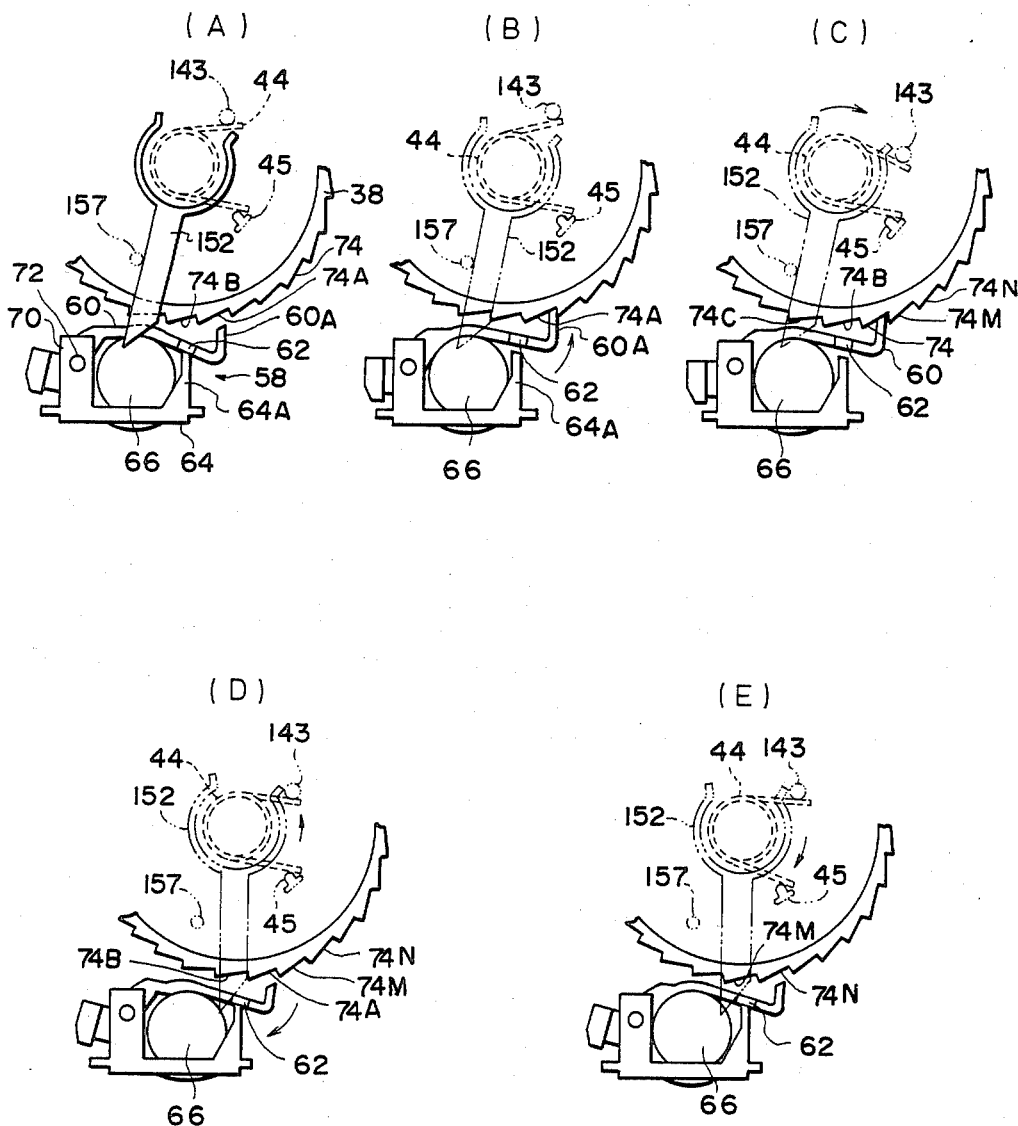
FIGS. 22 (A) to 22(E) illustrate the operations of the friction spring, the actuator and their associated elements which are employed in the tenth embodiment.

On the other hand, the occupant is moved by means of inertia in the opposite direction relative to the direction in which acceleration acts, and the webbing is therefore wound off from the takeup shaft 20, causing the latter to rotate in the clockwise direction as viewed in FIG. 22. In consequence, the lock ring 38 which rotates together with the takeup shaft 20 is prevented from rotating by the actuator 60, which fact generates relative rotation between the lock ring 38 and the takeup shaft 20. This relative rotation causes the torsion coil spring 44 to be deformed in the manner shown in FIG. 22(C). Consequently, the respective pins 34 and 36 of the lock plates 24 and 25 which rotate together with the takeup shaft 20 are guided by the associated slots 40 formed in the lock ring 38 in such a manner that the pawl portions 28 and 30 are engaged with the internally-toothed ratchet wheel 32, whereby the rotation of the takeup shaft 20 in the webbing wind-off direction is prevented. As a result, the occupant is brought into a reliable webbing restrained condition.

When the vehicle is running on a rough road with many irregularities, the ball 66 is placed in a state wherein it continuously pushes up the actuator 60. At the same time, the occupant is bumped up and down in response to the vibration of the vehicle body. For this reason, the webbing is repeatedly wound in and out on the takeup shaft 20.

In such a case, in this embodiment, the friction spring 152, which is pivoted by means of the force of the takeup shaft 20 which rotates in the webbing wind-up direction, pushes down the pin 62 of the actuator 60 through the slanting cam surface 154A, thus causing the pole 60A to separate from the ratchet tooth 74 with which it has been engaged, as shown in FIG. 22(D). In consequence, the lock ring 38, which is being subjected to the biasing force of the torsion coil spring 44 which has been compressed, is rotated clockwise as shown in FIG. 22(E) by the urging of that biasing force. Accordingly, the pole 60A of the actuator 60 which has opposed the ratchet tooth 74A now opposes the ratchet tooth 74N.

Even if, thereafter, the takeup shaft 20 is rotated in the webbing wind-off direction as the result of the vibration of the vehicle, the pole 60A of the actuator 60 engages with the ratchet tooth 74M or 74N. In consequence, the takeup shaft 20 is locked in a state wherein it has further rotated in the webbing wind-off direction from the previous locked position by an amount which corresponds to the length of one or more ratchet teeth 74. There is therefore no risk of the webbing being gradually wound up on the takeup shaft 20.

Thus, this embodiment involves no fear of the webbing being gradually wound up onto the takeup shaft 20 even when the vehicle is running on a rough road. Accordingly, it is possible for the occupant to drive the vehicle in a comfortable state even when the road condition is unfavorable.

Further, in this embodiment, the tightening prevention mechanism has a simple arrangement which is constituted by the rotating cap 142, the friction spring 152 and the projections 157 and 62. Moreover, it is possible for these constituent elements to be extremely easily assembled.

Figure 23:
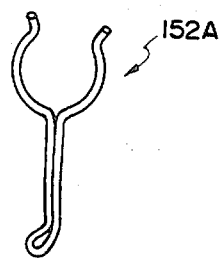
FIG. 23 is a side elevational view of a friction spring employed in an eleventh embodiment of the present invention.

Referring next to FIG. 23, there is shown a friction spring 152A which is employed in an eleventh embodiment of the present invention. The friction spring 152A is formed by bending a single metal wire. In correspondence with this friction spring 152A, the width of the outer peripheral surface 150 of the rotating cap 142 shown in FIG. 18 is made smaller than that in the case of the tenth embodiment.

Figure 24:
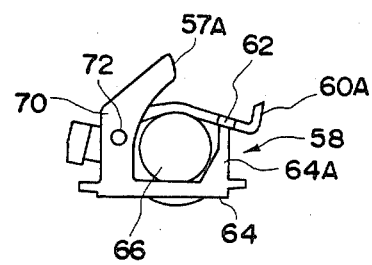
FIG. 24 is a side elevational view of a part of a twelfth embodiment of the present invention.

FIG. 24 shows a part of a twelfth embodiment of the present invention, in which the bracket 70 is extended such as to form a projecting end 57A which replaces the projection 157 shown in FIG. 20.

It is to be noted that the rotating cap 142 may be integrally formed with the takeup shaft 22 by means of molding.

Figure 25:
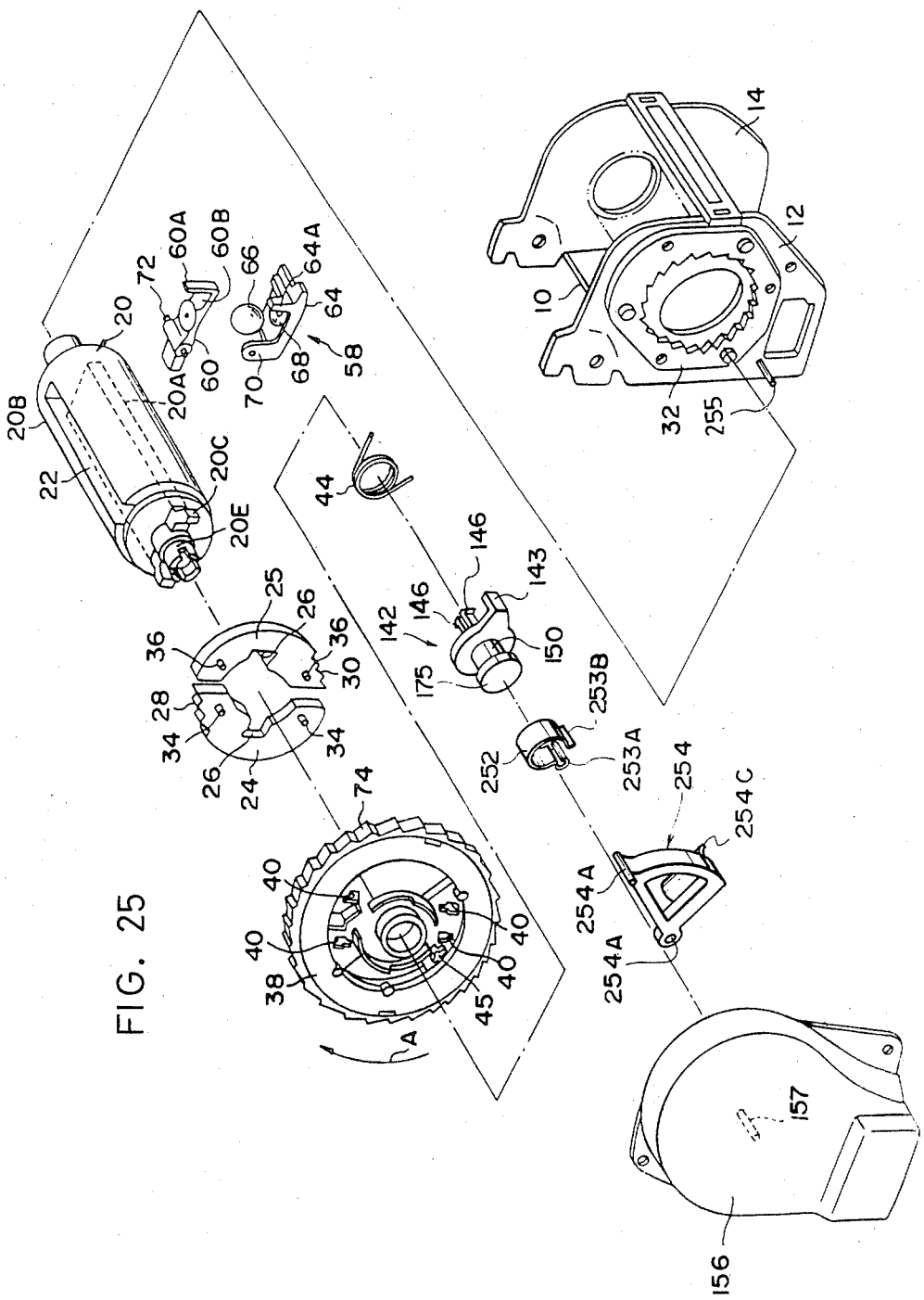
FIG. 25 is an exploded perspective view of a webbing retractor to which a thirteenth embodiment of the present invention is applied.

The following is a description of a thirteenth embodiment of the present invention with reference to FIG. 25.

This embodiment employs a friction spring 252 which has a configuration different from that of the friction spring 152 employed in the tenth embodiment, and a pusher 254.

The rotating cap 142 has the friction spring 252 serving as a limiting member resiliently fitted on its outer peripheral surface 150 in such a manner that the rotational force of the rotating cap 142 is transmitted to the friction spring 252 through frictional contact therebetween. The friction spring 252 has its peripheral end portions 253A and 253B bent outwardly. Accordingly, it is possible for the friction spring 252 to be easily mounted on the rotating cap 142 by bringing the peripheral end portions 253A and 253B into contact with the outer peripheral surface 150 and pressing the friction spring 252 toward the central axis of the rotating cap 142.

The peripheral end portion 253A of the friction spring 252 is curved in a cylindrical shape such as to pivotally and loosely support a pin 254A which is provided on the pusher 254. The pin 254A projects from one vertex of the triangular pusher 254. The pusher 254 further has a bore 254B formed at another vertex thereof, and a pin 255 which projects from the leg plate 12 is fitted into the bore 254B. Accordingly, when the friction spring 252 moves pivotally, the pusher 254 is pivoted about the pin 255.

The pusher 254 has a curved pressing piece 254C projecting therefrom in such a manner that it is possible for the pressing piece 254C to press down an arm 60B of the actuator 60.

The pivoting angle of the friction spring 252 is limited within the range of allowable movement of the pressing piece 254 which abuts against the arm 60B on one side and abuts against the pin 157 projecting from the inner surface of the cover 156 on the other. Thus, when the takeup shaft 20 rotates in the webbing wind-off direction, the pusher 254 pivots until the pressing piece 254C abuts against the pin 157; when the takeup shaft 20 rotates in the webbing wind-up direction, the pressing piece 254C abuts against the arm 60B and pushes down the latter, thus causing the pole 60A to separate from the ratchet teeth 74 in the manner shown in FIG. 26(D).

The operation of this embodiment will now be explained.

When the vehicle is running in normal conditions, the ball 66 is in a state wherein it does not push up the actuator 60, and the actuator 60 is therefore separated from the ratchet teeth 74 irrespective of the rotation of the friction spring 252, as shown in FIG. 26(A). Accordingly, it is possible for the occupant who is fastened by the webbing to freely cause the webbing to be wound in and out on the takeup shaft 20 so that he may assume a desired driving posture.

When the vehicle is in an emergency situation such as a collision, the ball 66 pushes up the actuator 60 in such a manner that the actuator 60 pivots about the pin 72. In consequence, the pole 60A is engaged with one of the ratchet teeth 74.

Figure 26:
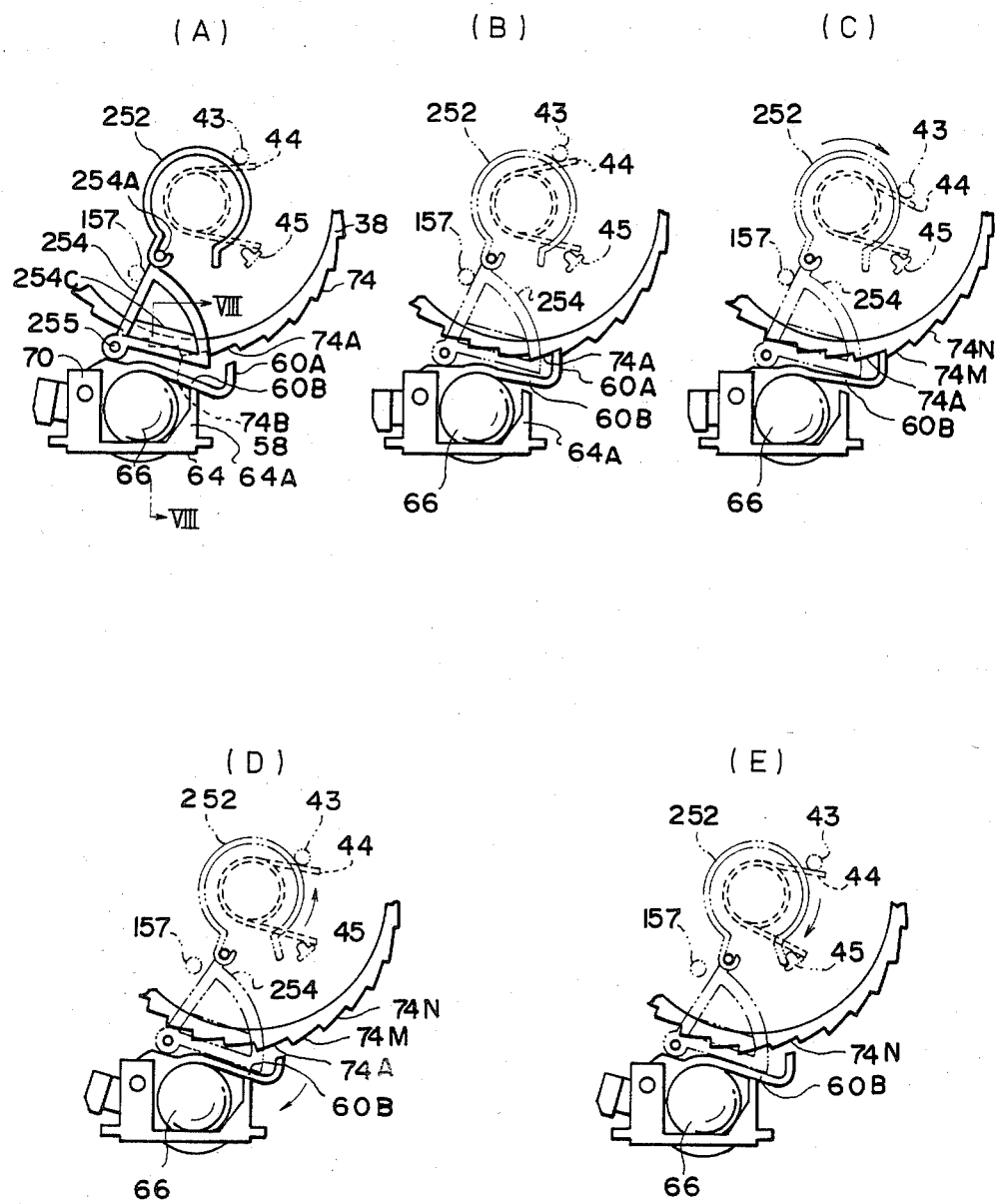
FIGS. 26(A) to 26(E) illustrate the operations of the limiting member, the actuator and their associated elements employed in the thirteenth embodiment.

On the other hand, the occupant is moved by means of inertia in the opposite direction relative to the direction in which accleration acts, and the webbing is therefore wound off from the takeup shaft 20, causing the latter to rotate in the clockwise direction as viewed in FIG. 26. In consequence, the rotation of the lock ring 38 which rotates with the takeup shaft 20 is prevented by the actuator 60, which fact generates relative rotation between the lock ring 38 and the takeup shaft 20. This relative rotation causes the torsion coil spring 44 to be deformed or compressed as shown in FIG. 26(C), and the respective pins 34 and 35 of the lock plates 24 and 25 which rotate together with the takeup shaft 20 are guided by the associated slots 40 formed in the lock ring 38 in such a manner that the pawl portions 28 and 30 are engaged with the internally-toothed ratchet wheel 32, whereby the rotation of the takeup shaft 20 in the webbing wind-off direction is prevented. As a result, the occupant is brought into a reliable webbing restrained condition.

When the vehicle is running on a rough road with many irregularities, the ball 66 is placed in a state wherein it continuously pushes up the actuator 60. At the same time, the occupant is bumped up and down in response to the vibration of the vehicle body. In consequence, the webbing is repeatedly wound in and out on the takeup shaft 20.

On such an occasion, in the conventional webbing retractor, every time the webbing is wound up, the lock ring 38 rotates counterclockwise from the position shown in FIG. 26(C) by an amount which exceeds the length of one of the ratchet teeth 74 and then reengages with the actuator 60, thus causing the webbing to be gradually wound up onto the takeup shaft 20. More specifically, in the case where the ratchet tooth 74A is engaged with the pole 60A in the state shown in FIG. 26(C), the vibration of the vehicle causes the ratchet tooth 74B or 74C to be engaged with the pole 60A, which fact involves a risk of the webbing being gradually wound up onto the takeup shaft 20.

This embodiment, however, overcomes the above-described disadvantage of the prior art. More specifically, as shown in FIG. 26(D), the pusher 254 is pivoted clockwise by the action of the friction spring 252 which is turned in response to the rotation of the takeup shaft 20 in the webbing wind-up direction. In consequence, the pressing piece 254C pushes down the arm 60B of the actuator 60, thus causing the pole 60A to separate from the ratchet teeth 74. Accordingly, the lock ring 38, which is being subjected to the biasing force of the torsion coil spring 44 which has been compressed, is rotated clockwise as shown in FIG. 26(E) by the urging of that biasing force. Consequently, the pole 60A of the actuator 60 which has opposed the ratchet tooth 74A now opposes the ratchet tooth 74N.

Even if, thereafter, the takeup shaft 20 is rotated in the webbing wind-off direction as the result of the vibration of the vehicle, the pole 60A of the actuator 60 engages with the ratchet tooth 74M or 74N. In consequence, the takeup shaft 20 is locked in a state wherein it has further rotated in the webbing wind-off direction from the previous locked position by an amount which corresponds to one or more ratchet teeth 74. There is therefore no risk of the webbing being gradually wound up onto the takeup shaft 20.

Thus, this embodiment involves no fear of the webbing being gradually wound up onto the takeup shaft 20 even when the vehicle is running on a rough road. It is therefore possible for the occupant to drive the vehicle in a comfortable state.

Further, since the pressing piece 254C is adapted to press against the arm 60B of the actuator 60 in the direction substantially orthogonal to the plane of the arm 60B of the actuator 60, the pressing piece 254C is able to apply a large torque to the actuator 60. It is therefore possible to cause the pole 60A to be reliably separated from the ratchet teeth 74.

Figure 27:
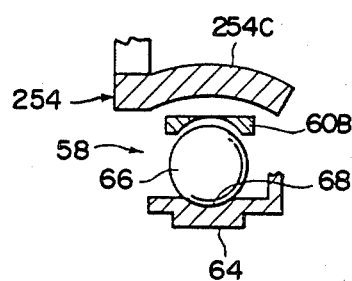
FIGS. 27(A) and 27(B) are sectional views taken along the line VIII—VIII of FIG. 26(A)
Figure 27B:
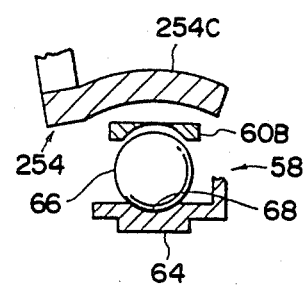

Furthermore, the disposition of the pressing piece 254C in relation to the arm 60B is such as that shown in FIG. 27(A), and the pressing piece 254C is curved. It is therefore possible for this arrangement to be employed even when the frame 10 is secured to the vehicle body at an inclination (i.e., the takeup shaft 20 is disposed in an inclined state with respect to the horizontal). More specifically, provided that the acceleration sensor 58 is horizontally disposed (such an acceleration sensor is referred to as an "inclined condition acceleration sensor"), even if the disposition of the pressing piece 254C in relation to the arm 60B is such as that shown in FIG. 27(B), it is still possible for the pressing piece 254C to press against the arm 60B in the direction substantially orthogonal to the plane of the arm 60B. For this reason, it is possible to employ pushers 254 with the same configuration irrespective of the type of inclined condition acceleration sensor employed (it is general practice to employ one of the five different types of sensors which respectively cope with inclination angles of $-10°$, $-5°$, $0°$, $5°$ and $10°$). Thus, it is possible to reduce the production cost as a whole.

Figure 28:
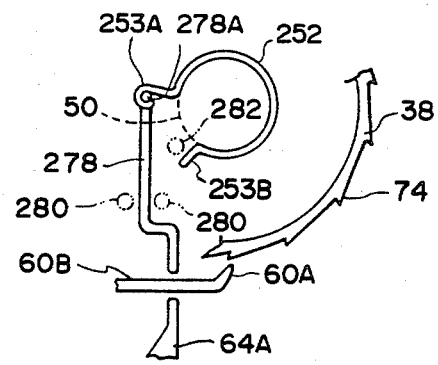
FIG. 28 is a front elevational view of a part of a fourteenth embodiment of the present invention.

The following is a description of a fourteenth embodiment of the present invention with reference to FIG. 28.

The fourteenth embodiment employs a pusher 278 which is formed by bending a rod. More specifically, the upper end portion 278A of the pusher 278 is bent at 90° and pivotally supported by the peripheral end portion 253A of the friction spring 252. The pusher 278 has its intermediate portion guided by guide pins 280 which project from the cover 156 (see FIG. 25) in such a manner that the pusher 278 is vertically movable. The lower end portion of the pusher 278 is bent at 90° toward the pole 60A, and the lower part of the lower end portion of the pusher 278 is further bent at 90° in the direction orthogonal to the plane of the arm 60B, whereby the torque applied to the arm 60B is increased. In the case where the takeup shaft 20 rotates in the webbing wind-off direction, when the friction spring 252 pivots by a predetermined angle, the peripheral end portion 253B of the spring 252 abuts against a stopper pin 282 which is provided on the cover 156 (see FIG. 25), whereby the pivoting angle of the friction spring 252 is limited. The other points are similar to those in the eighth embodiment.

It is to be noted that the projection 157 in the thirteenth embodiment and the stopper pin 282 in the fourteenth embodiment may be omitted.

The present invention may be applied to all types of lock mechanisms in which, when a vehicular emergency occurs, the lock ring rotates relative to the takeup shaft, and the lock member is thereby engaged with the lock teeth provided on the frame, thus preventing the rotation of the takeup shaft in the webbing wind-off direction.

It is, as a matter of course, possible to employ structures exclusive of the above-described ball as the acceleration sensing means of the present invention.

What is claimed is:

1. A lock mechanism for a webbing retractor which is employed in a seatbelt system for a vehicle and adapted to wind up an occupant restraining webbing onto a webbing takeup shaft by means of a biasing force, which comprises:
   (a) lock means adapted to prevent the rotation of said takeup shaft in the webbing wind-off direction when a vehicle emergency occurs, said lock means including a lock ring supported on said takeup shaft;
   (b) acceleration sensing means including an actuator adapted to engage with said lock ring to prevent the rotation of said takeup shaft in the webbing wind-off direction when a vehicular emergency occurs; and
   (c) limiting means for preventing engagement between the lock means and the accelerator sensing means when no vehicular emergency is occurring, said limiting means having frictional contact means, canacelling means and pivoting limiting means, wherein said limiting means is pivotally movable around the takeup shaft through the frictional contact of said friction contact means, said cancelling means includes a first leg member that is moved in a first direction in response to the pivoting of said frictional contact means and adapted to prevent a locked state of said lock means when said takeup shaft rotates in the webbing wind-up direction, and said pivoting limiting means includes a second leg member that is pivotally movable around the takeup shaft in a second direction when the takeup shaft rotates in a webbing wind-out direction to limit the pivoting range of said limiting means,
   whereby said webbing is prevented from being gradually wound up onto takeup shaft when said vehicle is running.

2. A lock mechanism according to claim 1, wherein said limiting means includes a cam surface constituting said cancelling means which is adapted to force said actuator to disengage from said lock ring when said takeup shaft rotates in the webbing wind-up direction.

3. A lock mechanism according to claim 2, wherein said limiting means includes a ring-shaped limiting plate which is disposed in coaxial relation to said takeup shaft and has said frictional contact means provided on its inner peripheral surface, said limiting plate further having on its outer peripheral surface a cam surface which constitutes said cancelling means, and said actuator has an abutting member adapted to abut against said cam when said takeup shaft rotates in the webbing wind-up direction, thereby moving said actuator in the direction in which it is separated from said lock ring.

4. A lock mechanism according to claim 3, wherein said pivoting limiting means is constituted by projections which respectively project from both sides of said cam surface, while the abutting member of said actuator is a pin which projects from said actuator, said pin being disposed between said projections, thereby limiting the pivoting range of said limiting means.

5. A lock mechanism according to claim 4, wherein said limiting plate is brought into frictional contact with said takeup shaft through the outer peripheral surface of a smaller-diameter portion of a hat-shaped rotating plate which is secured to one end portion of said takeup shaft.

6. A lock mechanism according to claim 3, wherein said limiting means includes a spring plate having a C-shaped portion which constitutes said frictional contact means and a pair of leg portions which respectively extend from both ends of said C-shaped portion, one of said leg portions having said cam surface formed in the vicinity of the end thereof, said cam surface being adapted to abut against the abutting member of said actuator thereby to separate said actuator from said lock ring.

7. A lock mechanism according to claim 6, wherein said pivoting limiting means is constituted by said leg portions, while said abutting member of said actuator is a pin which projects from said actuator, said pin being disposed between said leg portions, thereby limiting the pivoting range of said limiting means.

8. A lock mechanism for a webbing retractor which is employed in a seatbelt system for a vehicle and adapted to wind up an occupant restraining webbing onto a webbing takeup shaft by means of a biasing force, which comprises:

(a) lock means adapted to prevent the rotation of said takeup shaft in the webbing wind-off direction when a vehicle emergency occurs, said lock means including a lock ring supported on said takeup shaft;

(b) acceleration sensing means adapted to acutate said lock means when a vehicular emergency occurs, thereby preventing the rotation of said takeup shaft in the webbing wind-off direction, wherein said acceleration sensing means includes an actuator adapted to engage with said lock ring to prevent the rotation of the takeup shaft in the webbing wind-off direction, and (c) limiting means having frictional contact means constituted by a substantially C shaped friction spring and a cancelling means including a pusher having a substantially triangular cross-section, said pusher being pivotally supported at one vertex thereof in such a manner that the longitudinal axis of said pusher extends in parallel to the axial direction of said takeup shaft, said pusher being connected at another vertex thereof to said frictional contact means such that said pusher pivots about its first-described vertex in response to the pivoting of said friction spring, and said pusher having a pressing piece which abuts against said actuator in a direction substantially orthogonal to the plane of said actuator when said takeup shaft rotates in the webbing wind-up direction, thus causing said actuator to be separated from said lock ring, whereby said webbing is prevented from being gradually wound up onto said takeup shaft when said vehicle is running.

9. A lock mechanism for a webbing retractor which is employed in a seatbelt system for a vehicle and adapted to wind up an occupant restraining webbing onto a webbing takeup shaft by means of a biasing force, which comprises:

(a) lock means adapted to prevent the rotation of said takeup shaft in the webbing wind-off direction when a vehicle emergency occurs, said lock means including a lock ring supported on said takeup shaft;

(b) acceleration sensing means adapted to actuate said lock means when a vehicular emergency occurs, thereby preventing the rotation of said takeup shaft in the webbing wind-off direction, wherein said acceleration sensing means includes an actuator adapted to engage with said lock ring to prevent the rotation of the takeup shaft in the webbing wind-off direction, and (c) limiting means having frictional contact means constituted by a substantially C-shaped friction spring and cancelling means including a pusher, said frictional contact means transmitting the rotational force of said webbing takeup shaft through frictional contact, wherein said pusher is constituted by a rod which is suspended from one end of said C-shaped friction spring, said rod being moved in the direction in which said rod comes in and out of contact with said actuator when said friction spring pivots while being guided by guide members which are respectively disposed on both sides of said rod, whereby said webbing is prevented from being gradually wound up onto said takeup shaft when said vehicle is running.

10. A lock mechanism employed in a webbing retractor which has a takeup shaft adapted to wind up an occupant restraining webbing thereof and means for biasing the takeup shaft in the webbing wind-up direction, which comprises:

(a) lock means including a lock ring which is disposed in coaxial relation to said webbing takeup shaft and adapted to rotate together with the rotation of said takeup shaft in the webbing wind-off direction, said lock means being adapted to prevent the rotation of said takeup shaft in the webbing wind-off direction when a vehicular emergency occurs;

(b) acceleration sensing means including actuator adapted to engage with said lock ring when a vehicluar emergency occurs thereby to prevent the rotation of said takeup shaft in the webbing wind-off direction; and (c) limiting means including frictional contact means, separating means and pivot limiting means wherein the separating means is pivotally connected to a pin means displaced from said takeup shaft, and wherein said frictional contact means transmits the rotational force of said takeup shaft through frictional contact to said separating means to pivot it, and wherein said separating means abuts against said actuator when said takeup shaft rotates in the webbing wind-up direction thus causing said actuator to be separated from said lock ring, and said pivot limiting means includes a pin means for limiting the pivoting range of said separating means, whereby said webbing is prevented from being gradually wound up onto said takeup shaft when the vehicle is running so as to avoid any undesirable tightening of said webbing against the body of the occupant of the vehicle.

11. A lock mechanism according to claim 10, wherein said frictional contact means is constituted by a resilient member.

12. A lock mechanism according to claim 10, wherein said limiting means includes: a C-shaped portion which constitutes said frictional contact means; a pair of leg portions respectively extending from both ends of said C-shaped portion such as to constitute in combination said pivoting limiting means; and a cam portion formed on one of said leg portions in the vicinity of the end thereof such as to constitute said separating means.

13. A lock mechanism employed in a webbing rectractor which has a takeup shaft adapted to wind up an occupant restraining webbing thereon and means for biasing the takeup shaft in the webbing wind-up direction, which comprises:
   (a) lock means including a lock ring which is disposed in coaxial relation to said webbing takeup shaft and adapted to rotate together with the rotation of said takeup shaft in the webbing wind-off direction, said lock means being adapted to prevent the rotation of said takeup shaft in the webbing wind-off direction when a vehicular emergency occurs;
   (b) acceleration sensing means including an actuator adapted to engage with said lock ring when a vehicular emergency occurs thereby to prevent the rotation of said takeup shaft in the webbing wind-off direction; and
   (c) limiting means including frictional contact means constituted by a substantially C-shaped friction spring, and separating means including a pusher, wherein said pusher has a substantially triangular cross section, said pusher being pivotally supported at one vertex thereof in such a manner that the longitudinal axis of said pusher extends in parallel to the axial direction of said takeup shaft, said pusher being connected at another vertex thereof to said frictional contact means such that said pusher pivots about its first-described vertex in response to the pivoting of said friction spring, and said pusher having a pressing piece which abuts against said actuator in a direction substantially orthogonal to the plane of the actuator when said takeup shaft rotates in the webbing wind-up direction, thus causing said actuator to be separated from said lock ring,
   whereby said webbing is prevented from being gradually wound up onto said takeup shaft when the vehicle is running so as to avoid any undesirable tightening of said webbing against the body of the occupant of the vehicle.

14. A lock mechanism employed in a webbing retractor which has a takeup shaft adapted to wind up an occupant restraining webbing thereon and means for biasing the takeup shaft in the webbing wind-up direction, which comprises:
   (a) lock means including a lock ring which is disposed in coaxial relation to said webbing takeup shaft and adapted to rotate together with the rotation of said takeup shaft in the webbing wind-off direction, said lock means being adapted to prevent the rotation of said takeup shaft in the webbing wind-off direction when a vehicluar emergency occurs;
   (b) acceleration sensing means including an acutator adapted to engage with said lock ring when a vehicular emergency occurs thereby to prevent the rotation of said takeup shaft in the webbing wind-off direction; and
   (c) limiting means including frictional contact means constituted by a substantially C-shaped friction spring, and separating means including a pusher wherein said pusher is constituted by a rod which is suspended from one end of said C-shaped friction spring, said rod being moved in a direction substantially orthogonal to the plane of said actuator when said shaft rotates in the webbing wind-up direction, and in which said rod comes in and out of contact with said actuator when said friction spring pivots while being guided by guide members which are respectively disposed on both sides of said rod, thus causing said actuator to be separated from said lock ring,
   whereby said webbing is prevented from being gradually wound up onto said takeup shaft when the vehicle is running so as to avoid any undesirable tightening of said webbing against the body of the occupant of the vehicle.

* * * * *

UNITED STATES PATENT AND TRADEMARK OFFICE
CERTIFICATE OF CORRECTION

PATENT NO. : 4,729,523

DATED : March 8, 1988

INVENTOR(S) : Toshio Saitou, Kenji Matsui, Keiichi Tamura, Shinji Mori, and Shingo Izuchi It is certified that error appears in the above-identified patent and that said Letters Patent is hereby corrected as shown below:

On The Title Page Item "[75] should read

--      [75] Inventors: Toshio Saitou; Kenji Matsui; Keiichi Tamura; Shinji Mori, and Shingo Izuchi, of all Aichi, Japan. --.

Signed and Sealed this

Eleventh Day of October, 1988

Attest:

DONALD J. QUIGG

*Attesting Officer*      *Commissioner of Patents and Trademarks*